United States Patent
Luo et al.

(10) Patent No.: US 11,636,044 B2
(45) Date of Patent: Apr. 25, 2023

(54) LOGICAL-TO-PHYSICAL MAPPING

(71) Applicant: Micron Technology, Inc., Boise, ID (US)

(72) Inventors: Xiangang Luo, Fremont, CA (US); Jianmin Huang, San Carlos, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/859,963

(22) Filed: Jul. 7, 2022

(65) Prior Publication Data

US 2022/0342829 A1 Oct. 27, 2022

Related U.S. Application Data

(63) Continuation of application No. 16/996,329, filed on Aug. 18, 2020, now Pat. No. 11,409,661.

(51) Int. Cl.
 *G06F 12/1009* (2016.01)
 *G06F 11/10* (2006.01)

(52) U.S. Cl.
 CPC ...... *G06F 12/1009* (2013.01); *G06F 11/1068* (2013.01); *G06F 2212/657* (2013.01)

(58) Field of Classification Search
 CPC ............. G06F 12/1009; G06F 11/1068; G06F 2212/657
 See application file for complete search history.

(56) References Cited

U.S. PATENT DOCUMENTS

| | | | |
|---|---|---|---|
| 2014/0231954 A1 | 8/2014 | Lue | |
| 2016/0179386 A1 | 6/2016 | Zhang | |
| 2019/0087089 A1* | 3/2019 | Yoshida | ................ G06F 3/0658 |
| 2019/0266100 A1* | 8/2019 | Mello | ................. G06F 12/0246 |
| 2019/0324855 A1* | 10/2019 | Yeh | ......................... G06F 12/10 |
| 2020/0089569 A1* | 3/2020 | Cadloni | ................. G11C 29/52 |
| 2020/0133847 A1* | 4/2020 | Venkatasubramanian ................... G06F 12/0804 |
| 2020/0192815 A1* | 6/2020 | Lee | ..................... G06F 12/1009 |

FOREIGN PATENT DOCUMENTS

WO 2017074570 A1 5/2017

OTHER PUBLICATIONS

Choudhuri, et al., "Performance Improvement of Block Based NAND Flash Translation Layer", retrieved from https://www.ics.uci.edu/~givargis/pubs/C32.pdf., Sep. 30-Oct. 3, 2007, 6 pages.

* cited by examiner

*Primary Examiner* — Sean D Rossiter
(74) *Attorney, Agent, or Firm* — Brooks, Cameron & Huebsch, PLLC

(57) ABSTRACT

A logical to physical (L2P) mapping component can determine whether an offset between a physical page address (PPA) and a logical block address (LBA) will be altered in response to writing data corresponding to the PPA and comprising at least one redundant array of independent NAND parity bit to a first level of a logical to physical (L2P) data structure or a second level of the L2P data structure, or both. The L2P mapping component can further cause an indication comprising at least two bits corresponding to the offset to be written to the first level of the L2P data structure or the second level of the L2P data structure, or both.

20 Claims, 4 Drawing Sheets

US 11,636,044 B2

LOGICAL-TO-PHYSICAL MAPPING

PRIORITY INFORMATION

This application is a Continuation of U.S. application Ser. No. 16/996,329, filed Aug. 18, 2020, the contents of which are included herein by reference.

TECHNICAL FIELD

Embodiments of the disclosure relate generally to memory sub-systems, and more specifically, relate to logical-to-physical mapping.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
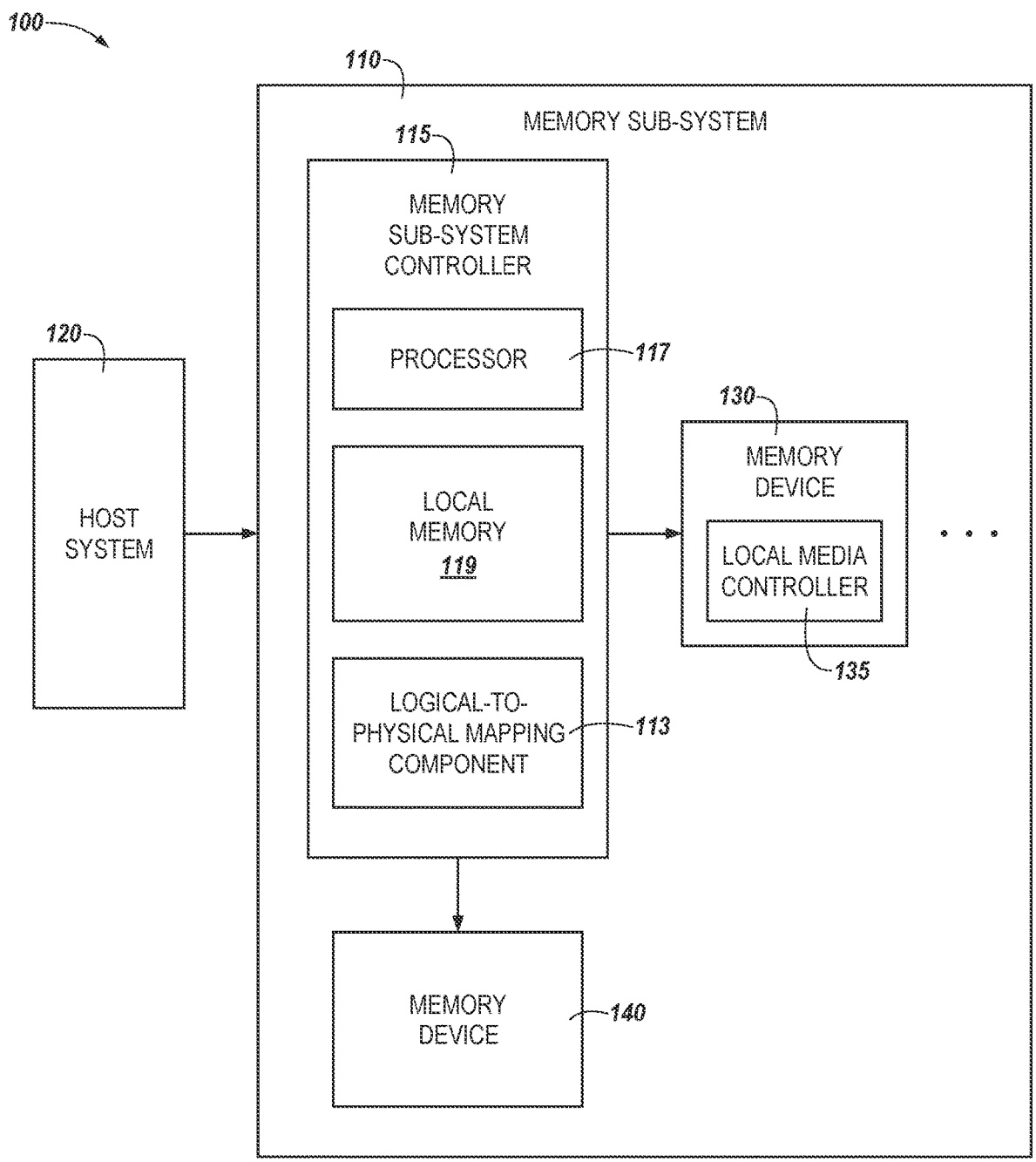
FIG. 1 illustrates an example computing system that includes a memory sub-system in accordance with some embodiments of the present disclosure.

Aspects of the present disclosure are directed to logical-to-physical (L2P) mapping, in particular to memory sub-systems that include a L2P mapping component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

During operation, data can be written to a memory sub-system and stored for subsequent retrieval. The data can be written consecutively such that the data is written to a consecutive series of memory blocks or, the data can be written non-consecutively such that the data is written to memory blocks that do not form part of a consecutive series of memory blocks. In order to keep track of the physical locations in the memory sub-system in which data is stored, physical page addresses (e.g., addresses that correspond to a physical memory cell or memory block in which the data is stored) are recorded in a logical block address (LBA) in a logical-to-physical (L2P) data structure that is maintained within the memory sub-system.

In some approaches, the L2P data structure can be a P-level L2P table, where P is a non-zero integer. A simple example in accordance with some approaches may include a 3-level L2P table. The first-level table may contain addresses of the second-level tables, which may be referred to as "segments." In turn, the second-level table can contain addresses associated with the third-level tables. In some approaches, each segment may include an L2P table for a small range of LBAs (e.g., 1024 LBAs).

Such approaches can attempt to simplify mapping between the physical page addresses (PPAs) and the LBAs by recording certain indications in certain levels of the L2P tables based on whether the PPAs and/or LBAs are consecutive or non-consecutive. For example, some approaches can record the PPA of an LBA in a third-level L2P table if the PPA written to the third-level L2P data structure is consecutive and record a single bit indication (e.g., a "1") in the second-level L2P table corresponding to the PPA written to the third-level L2P table being consecutive. In addition, some approaches can record the PPA of an LBA in a third-level L2P table if the PPA written to the third-level L2P data structure is non-consecutive and record a single bit indication (e.g., a "0") in the second-level L2P table corresponding to the PPA written to the third-level L2P table being non-consecutive. In accordance with such approaches, when a host write is sequential, the data (e.g., the PPAs) written to the third-level L2P table should be sequential as well.

However, as improved media management techniques, such as advanced read recovery methodologies, are developed and implemented in memory sub-systems, such simplistic approaches can suffer from various deficiencies. For example, as parity-based data recovery techniques such as redundant array of NAND (RAIN), among others, gain prevalence in memory sub-systems, the approaches described above can become unwieldy and inefficient. As an example, if RAIN parity data is written to an L2P table in addition to the PPA, in the approaches described above, a consecutive host write can yield a non-consecutive entry in the L2P table, which can lead to scenarios in which the L2P entry crosses from one memory block to another. In such scenarios, keeping track of the data can require additional resources in tracking non-consecutive L2P table entries across multiple blocks of the memory sub-system.

Aspects of the present disclosure address the above and other deficiencies by recording an offset between the LBA and the PPA using a multi-bit indication. As described in more detail herein, if the offset is altered based on the opening of a new memory block (e.g., because an L2P entry will cross from one memory block to another), a particular indication can be written to a pair of bits in the second-level L2P data structure in addition to a string of bits corresponding to the LBA of the first position in the new block. LBAs before the first position in the new block can use one offset based on the stored indication while LBAs after the first position in the new block can use a different offset based on the indication. This can further allow for the third-level L2P data structure to be generated based on the offset and/or a controller hardware auxiliary engine.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a logical-to-physical (L2P) mapping component 113. Although not shown in FIG. 1 so as to not obfuscate the drawings, the L2P mapping component 113 can include various circuitry to facilitate mapping of logical-to-physical addresses within the memory sub-system 110. In some embodiments, the L2P mapping component 113 can include special purpose circuitry in the form of an ASIC, FPGA, state machine, and/or other logic circuitry that can allow the L2P mapping component 113 to orchestrate and/or perform operations to perform L2P mapping operations for the memory device 130 and/or the memory device 140.

In some embodiments, the memory sub-system controller 115 includes at least a portion of the L2P mapping component 113. For example, the memory sub-system controller 115 can include a processor 117 (processing device) configured to execute instructions stored in local memory 119 for performing the operations described herein. In some embodiments, the L2P mapping component 113 is part of the host system 110, an application, or an operating system.

In a non-limiting example, an apparatus (e.g., the memory sub-system 110) can include a L2P mapping component 113. The L2P mapping component 113 can be resident on the memory sub-system 110. As used herein, the term "resident on" refers to something that is physically located on a particular component. For example, the L2P mapping component 113 being "resident on" the memory sub-system 110 refers to a condition in which the hardware circuitry that comprises the L2P mapping component 113 is physically located on the memory sub-system 110. The term "resident on" may be used interchangeably with other terms such as "deployed on" or "located on," herein.

Figure 2:
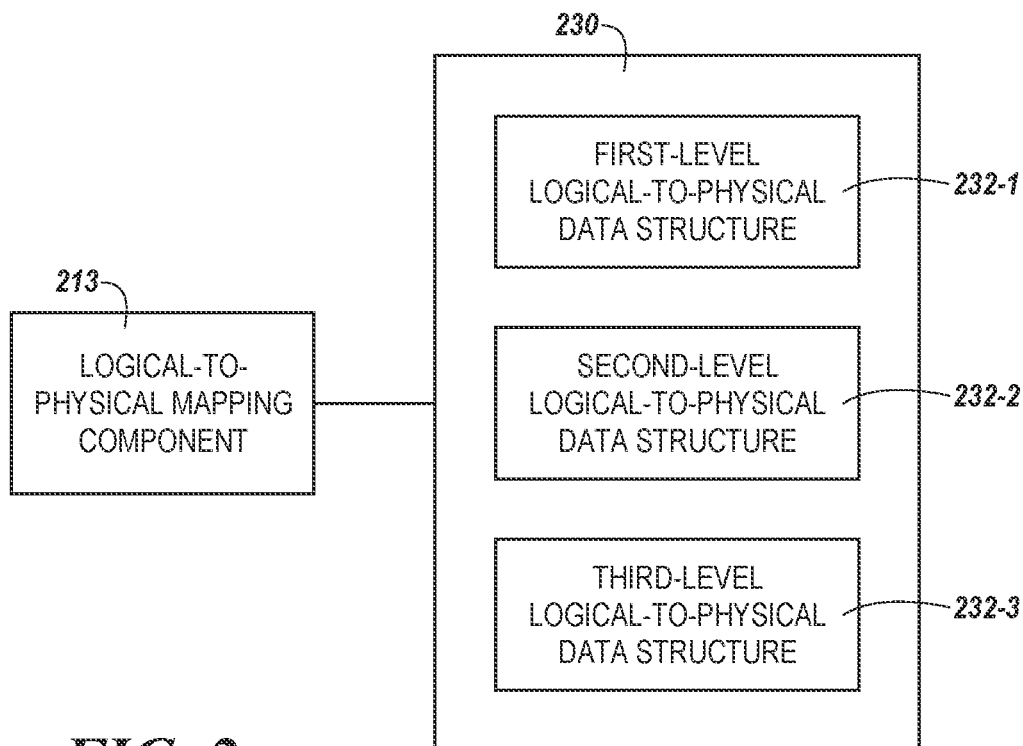
FIG. 2 illustrates an example logical-to-physical mapping component and memory device in accordance with some embodiments of the present disclosure.

The L2P mapping component 113 can determine whether an offset between a physical page address (PPA) and a logical block address (LBA) will be altered in response to writing data corresponding to the PPA to a first level of a logical to physical (L2P) data structure (e.g., one of the L2P data structures 232-1 to 232-3 illustrated in FIG. 2) and/or a second level of the L2P data structure (e.g., one of the L2P data structures 232-1 to 232-3 illustrated in FIG. 2). The L2P mapping component 113 can cause an indication comprising at least two bits and corresponding to the offset to be written to one level of the L2P data structure and/or another level of the L2P data structure. In some embodiments, the data corresponding to the PPA can include at least one redundant array of independent NAND parity bit.

Figure 3:
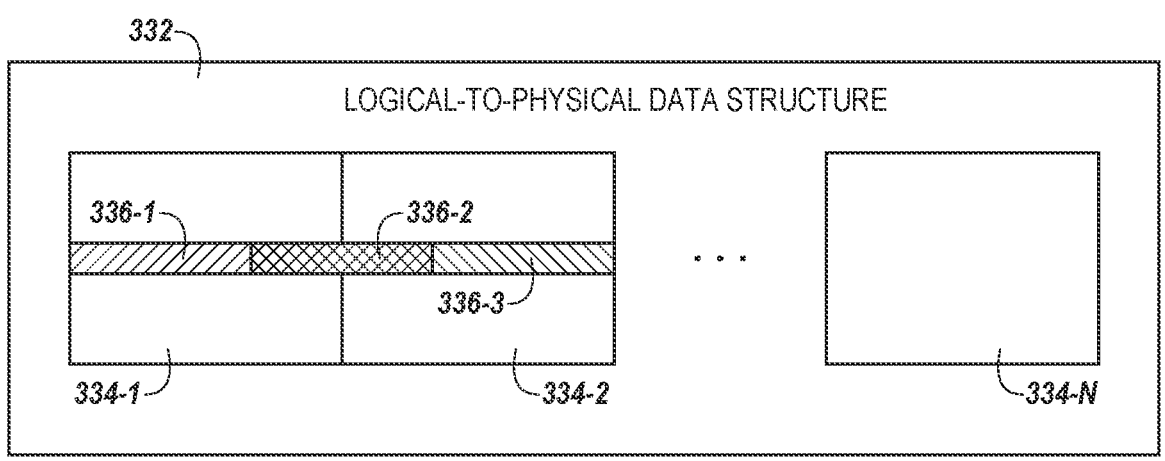
FIG. 3 illustrates an example logical-to-physical data structure in accordance with some embodiments of the present disclosure.

The indication can correspond to a determination that a first portion of the data is consecutive with respective to a preceding L2P address written to one level of the L2P data structure (e.g., the second-level L2P data structure 232-2) or another level of the L2P data structure (e.g., the third-level L2P data structure 232-3), and a second portion of the data is consecutive with respect to a subsequent L2P address written to one level of the L2P data structure or another level of the L2P data structure, as described in more detail in connection with FIG. 3, herein. Embodiments are not so limited, however, and in some embodiments, the indication can correspond to a determination that one level of the L2P data structure and another level of the L2P data structure contain consecutively written data or a determination that one level of the L2P data structure or another level of the L2P data structure, or both, contain non-consecutively written data. Further, in some embodiments, the indication can correspond to a determination that a first portion of the data corresponding to the PPA is written to one level of the L2P data structure and the second portion of the data corresponding to the PPA is written to another level of the L2P data structure.

Continuing with this example, the offset can be altered in response to a memory block (e.g., the memory block 334-2 illustrated in FIG. 3, herein) being opened to accommodate at least a portion of the data corresponding to the PPA. For example, as described in more detail in connection with FIG. 3, herein, the data corresponding to the PPA (e.g., the L2P address 336-2 illustrated in FIG. 3, herein) can straddle two memory blocks (e.g., the memory blocks 334-1 and 334-2 illustrated in FIG. 3, herein) thereby necessitating opening a new block (e.g., the memory block 334-2 illustrated in FIG. 3, herein) to accommodate the data corresponding to the PPA. As described in connection with FIG. 3, this can cause a portion of the data corresponding to the PPA to be consecutive with respect to a preceding set of data corresponding to a different PPA (e.g., the L2P address 336-1 illustrated in FIG. 3, herein) and a different portion of the data corresponding to the PPA to be consecutive with respect to data corresponding to yet another PPA (e.g., the L2P address 336-3 illustrated in FIG. 3, herein) that is written subsequently.

Finally, in this non-limiting example, a first portion of the data corresponding to the PPA can be written to the first level of the L2P data structure and a second portion of the data corresponding to the PPA can be written to the second level of the L2P data structure. In this case, the offset can be altered based, at least in part, on the first portion of the data being written to one level of the L2P data structure and the second portion of the data being written to another level of the L2P data structure.

FIG. 2 illustrates an example logical-to-physical (L2P) mapping component 213 and memory device 230 in accordance with some embodiments of the present disclosure. The L2P mapping component 213 can be analogous to the L2P mapping component 113 illustrated in FIG. 1, while the memory device 230 can be analogous to the memory device 130 illustrated in FIG. 1, herein.

As shown in FIG. 2, the memory device 230 can include multiple L2P data structures 232-1, 232-2, and 232-3. For example, the memory device 230 can include a first-level L2P data structure 232-1, a second-level L2P data structure 232-2, and a third-level L2P data structure 232-3. Embodiments are no limited to scenarios in which the memory device 230 includes three discrete L2P data structures, however, and the memory device 230 can include any number of L2P data structures. As described above, the first-level L2P data structure 232-1 can contain addresses of the second-level L2P dada structure 232-2, and the second-level L2P data structure 232-2 can contain addresses associated with the third-level L2P data structure 232-3.

Data corresponding to PPAs (e.g., L2P addresses, such as the L2P addresses 336-1, 336-2, and/or 336-3 illustrated in FIG. 3, herein) can be written to the first-level L2P data structure 232-1, the second-level L2P data structure 232-2, and/or the third-level L2P data structure 232-3 in accordance with embodiments described herein. For example, L2P addresses can be written to the first-level L2P data structure 232-1, the second-level L2P data structure 232-2, and/or the third-level L2P data structure 232-3 as described in connection with Table 1, below.

FIG. 3 illustrates an example logical-to-physical (L2P) data structure 332 in accordance with some embodiments of the present disclosure. The L2P data structure 332 can be analogous to the L2P data structures 232-1, 232-2, and/or 232-3 illustrated in FIG. 2. As shown in FIG. 3, the L2P data structure 332 can include multiple blocks of memory 334-1 to 334-N to which data corresponding to PPAs, such as L2P addresses 336-1, 336-2, and/or 336-3 can be written.

In the example shown in FIG. 3, the L2P addresses 336-1 and 336-3 contain consecutive data entries such that they are each include within a single memory block 334-1 to 334-N. For example, the L2P address 336-1 is contained in the memory block 334-1 and the L2P address 336-3 is contained within the memory block 334-2. However, the L2P address 336-2 has a first portion that is written to the first memory block 334-1 and a second portion that is written to the second memory block 334-2 such that the L2P address 336-2 straddles the two memory blocks 334-1 and 334-2. Stated alternatively, the L2P address 336-2 can be non-consecutive and/or can be offset from a starting address location of the first memory block 334-1 and a starting address of the second memory block 334-2, as described in more detail in connection with Table 1.

Table 1 illustrates an example logical-to-physical mapping when data corresponding to a PPA and/or a L2P address (e.g., the L2P address 336-2) straddles two memory blocks 334-1 and 334-2. In the example illustrated in Table 1, one portion of the L2P address 336-2 is in a previous open memory block 334-1 while another portion of the L2P address 336-2 is located in a next open memory block 334-2. Assuming then that the PPA-LBA=X and the next offset is Y, the L2P addresses 336-1, 336-2, and/or 336-3 can be determined as shown in Table 1.

TABLE 1

| PREVIOUS L2P | CURRENT L2P | NEXT L2P |
|---|---|---|
| X + LBA | X + LBA | Y + LBA |
| X + LBA | . . . | Y + LBA |
| X + LBA | X + LBA | Y + LBA |
| X + LBA | Y + LBA (or LBA Z) | Y + LBA |
| . . . | . . . | . . . |
| X + LBA | Y + LBA | Y + LBA |

As shown in Table 1, a preceding second-level L2P address (e.g., a L2P address written to the second-level L2P data structure 232-2 illustrated in FIG. 2, herein) can be X, a current L2P address can be (0x8000|Z) and the next L2P address can be Y. From this it follows that the second-level L2P address for a non-consecutive third-level L2P address (e.g., a L2P address written to the third-level L2P data structure 232-3 illustrated in FIG. 2, herein) can be (0x4000|The PPA of the third-level L2P address).

In a non-limiting example, a memory sub-system (e.g., the memory sub-system 110 illustrated in FIG. 1, herein) can include a memory device (e.g., the memory device 130 illustrated in FIG. 1, herein) that can store a logical to physical (L2P) data structure 332 that includes a first memory block 334-1 and a second memory block 334-2. A processing device (e.g., the L2P mapping component 213 illustrated in FIG. 2, herein) can be coupled to the memory device and perform various operations. For example, the processing device can perform operations that include determining that a first portion of a logical-to-physical (L2P) address 336-2 is to be written to the first memory block 334-1 and a second portion of the L2P address 336-2 is to be written to the second memory block 334-2. As described elsewhere herein, the L2P address 336-2 can include at least one parity bit.

The processing device can further perform operations including determining whether an offset corresponding to a physical page address (PPA) and a logical block address (LBA) associated with the L2P address 336-2 occurs based on the first portion of the L2P address 336-2 being written to the first memory block 334-1 and the second portion of the L2P address 336-2 being written to the second memory block 334-2 and writing an indication comprising at least two bits and corresponding to the offset to the L2P address 336-2. In some embodiments, the indication corresponds to a determination that a new memory block (e.g., the memory block 334-2) is being opened to accommodate at least a portion of the L2P address 336-2.

In some embodiments, a first bit and a second bit associated with the indication correspond to a determination that the first portion of the L2P address 336-2 is consecutive with respect to a preceding L2P address (e.g., the L2P address 336-1) written to the first memory block 334-1 and the second portion of the L2P address 336-2 is consecutive with respect to a subsequent L2P address (e.g., the L2P address 336-3) written to the second memory block 334-2. In some embodiments, a first bit (e.g., the bit 438-30 illustrated in FIG. 4, herein) and a second bit (e.g., the bit 438-31 illustrated in FIG. 4, herein) associated with the indication correspond to a determination that data written to the first memory block 334-1 and the second memory block 334-2 is non-consecutive.

Continuing with this example, in some embodiments, the processing device can perform operations including writing a particular bit sequence to a second level of the L2P data structure (e.g., the second-level L2P data structure 232-2 illustrated in FIG. 2, herein) in response to determining that the offset does not affect the data written to a first level of the L2P data structure (e.g., the third-level L2P data structure 232-3 illustrated in FIG. 2, herein). Embodiments are not so limited, however, and in some embodiments, the processing device can perform operations including writing a particular bit sequence to a second level of the L2P data structure in response to determining that the offset affects the data written to a first level of the L2P data structure, etc.

Figure 4:
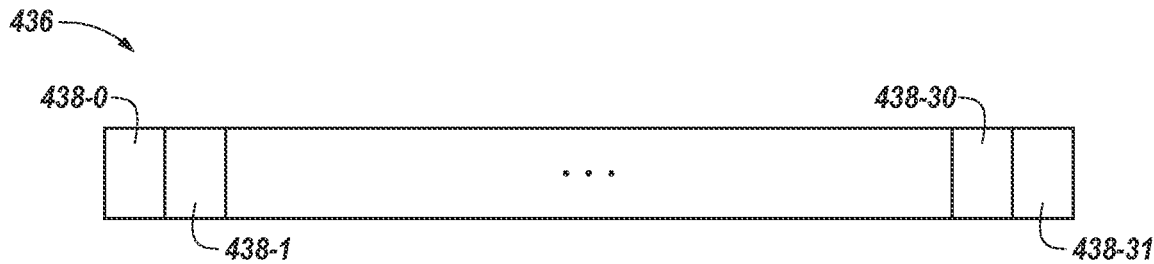
FIG. 4 illustrates an example of a logical-to-physical address in accordance with some embodiments of the present disclosure.

FIG. 4 illustrates an example of a logical-to-physical address 436 in accordance with some embodiments of the present disclosure. The L2P address 436 can be analogous to the L2P addresses 336-1, 336-2, and/or 336-3 illustrated in FIG. 3. As shown in FIG. 4, the L2P address can include 32 bits (e.g., the bits 338-0 to 338-31), although embodiments are not so limited.

In some embodiments, the L2P address 436 can include parity data, such as a redundant array of independent NAND (RAIN) parity bit(s) in addition to information corresponding to a physical location in a memory sub-system (e.g., the memory sub-system 110 illustrated in FIG. 1, herein) in which data is stored. The L2P address 436 can further include an indication corresponding to an offset that refers to a number of memory locations by which non-consecutive PPA information stored within the L2P address 436 is physically shifted within a L2P data structure (e.g., the L2P data structure 332 illustrated in FIG. 3). In some embodiments, the indication corresponding to the offset information can include two bits (e.g., a logical 00, logical 01, logical 10, or logical 11) and can be stored in the last two bits (e.g., the bits 438-30 and 438-31) of the L2P address 436.

In embodiments in which the offset is not changed for a third-level L2P data structure (e.g., the third-level L2P data structure 232-3 illustrated in FIG. 2, herein), the indication bits can be recorded as both zero, i.e., "00" in bits 438-30 and 438-31 of the L2P address 436 in the second-level L2P data structure (e.g., the second-level L2P data structure 232-2 illustrated in FIG. 2, herein) if the PPA-LBA≥0. In the event that the PPA-LBA<0, the indication bits can be recorded as both one, i.e., "11" in bits 438-30 and 438-31 of the L2P address 436 in the second-level L2P data structure.

In contrast, in embodiments in which the offset is altered due to opening a new memory block (e.g., the memory block 334-2 illustrated in FIG. 3, herein), and the previous L2P address and/or a subsequent L2P address are consecutive as described above, the indication bits can be recorded as a one and a zero, i.e., "10" in bits 438-30 and 438-31 of the L2P address 436 in the second-level L2P data structure. As described in connection with Table 1, above, LBAs before the starting LBA can use the previous offset while LBAs after the starting LBA can use the next offset. Finally, the indication bits can be recorded as a zero and a one, i.e., "01" in bits 438-30 and 438-31 of the L2P address 436 in the second-level L2P data structure to indicate that the third-level L2P data structure contains non-consecutive data.

Figure 5:
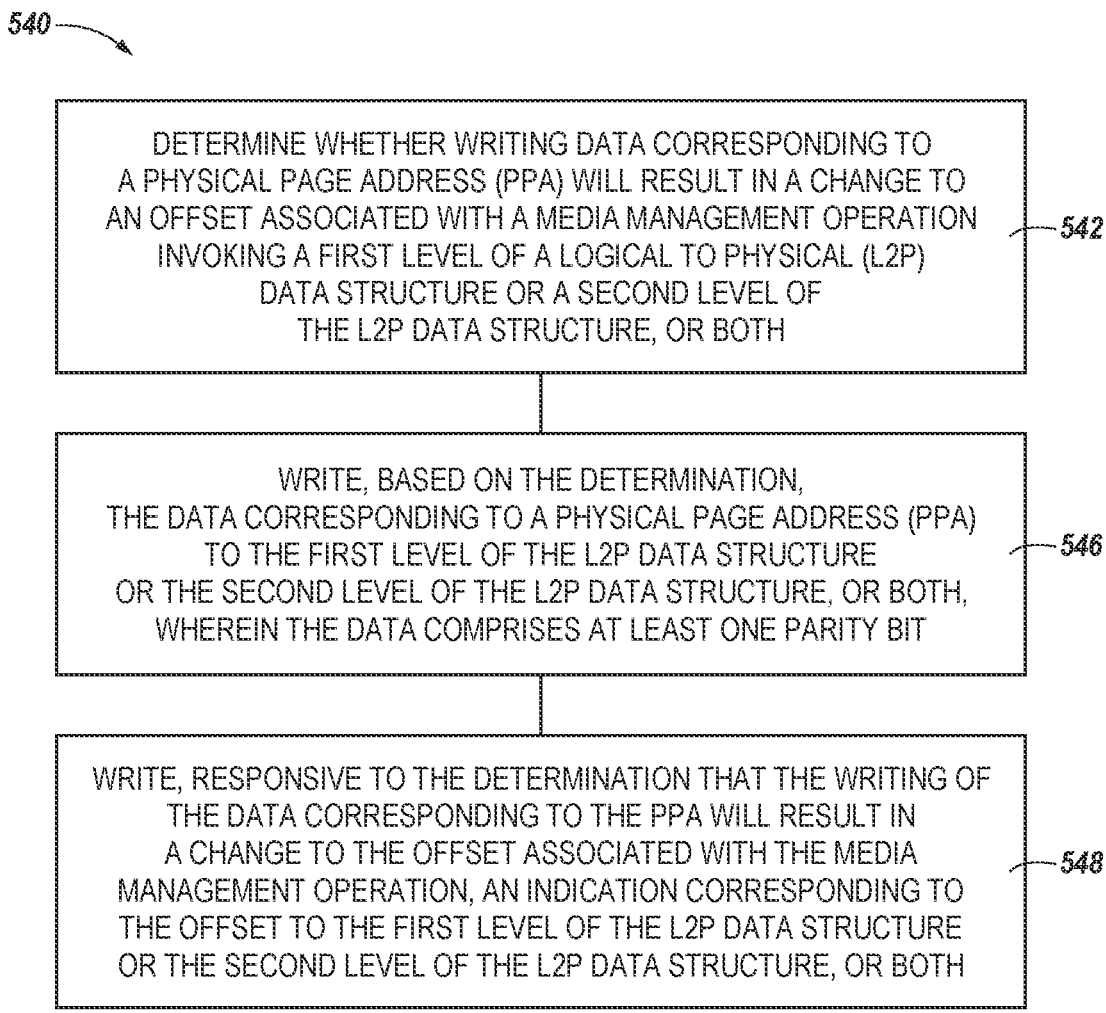
FIG. 5 is a flow diagram corresponding to a method for logical-to-physical mapping in accordance with some embodiments of the present disclosure.

FIG. 5 is flow diagram corresponding to a method 540 for memory dice arrangement in accordance with some embodiments of the present disclosure. The method 540 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 540 is performed by the logical-to-physical mapping component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 542, whether writing data corresponding to a physical page address (PPA) will result in a change to an offset associated with a media management operation invoking a first level of a logical to physical (L2P) data structure (e.g., one of the L2P data structures 232-1 to 232-3 illustrated in FIG. 2, herein) and/or a second level of the L2P data structure (e.g., a different one of the L2P data structures 232-1 to 232-3 illustrated in FIG. 2, herein) can be determined. In some embodiments, the change to the offset corresponds to the data being written across two memory blocks (e.g., the memory blocks 334-1 to 334-N illustrated in FIG. 3, herein) of a memory sub-system (e.g., the memory sub-system 110 illustrated in FIG. 1, herein).

At operation 544, based on the determination, the data corresponding to a physical page address (PPA) to the first level of the L2P data structure and/or the second level of the L2P data structure can be written. In some embodiments, the data can include at least one parity bit, such a RAIN recovery parity bit. The data corresponding to the PPA can include a thirty-two bit data string and the method 540 can further include writing the indication corresponding to the offset to a thirty-first and a thirty-second location in the thirty-two bit data string.

At operation 546, responsive to the determination that the writing of the data corresponding to the PPA will result in a change to the offset associated with the media management operation, an indication corresponding to the offset to the first level of the L2P data structure and/or the second level of the L2P data structure can be written. In some embodiments, the indication can include two bits, and the method 540 can further include writing a particular two bit data value corresponding to a characteristic of the data corresponding to the PPA, the characteristic indicative of the data corresponding to the PPA being written to the first level of the L2P data structure and/or the second level of the L2P data structure.

The method 540 can further include writing a particular bit sequence to the second level of the L2P data structure in response to determining that the offset does not affect the data written to the first level of the L2P data structure and/or writing a particular bit sequence to the second level of the L2P data structure in response to determining that the offset affects the data written to the first level of the L2P data structure. Embodiments are not so limited, however, and in some embodiments, the method 540 can include writing a particular bit sequence to the second level of the L2P data structure in response to determining that the data written to the first level of the L2P data structure corresponds to a non-consecutive PPA with respect to a preceding L2P address written to the first level of the L2P data structure or the second level of the L2P data structure, and a second portion of the data is consecutive with respect to a subsequent L2P address written to the first level of the L2P data structure or the second level of the L2P data structure. The particular bit sequences can be determined as described above in connection with FIG. 4.

Figure 6:
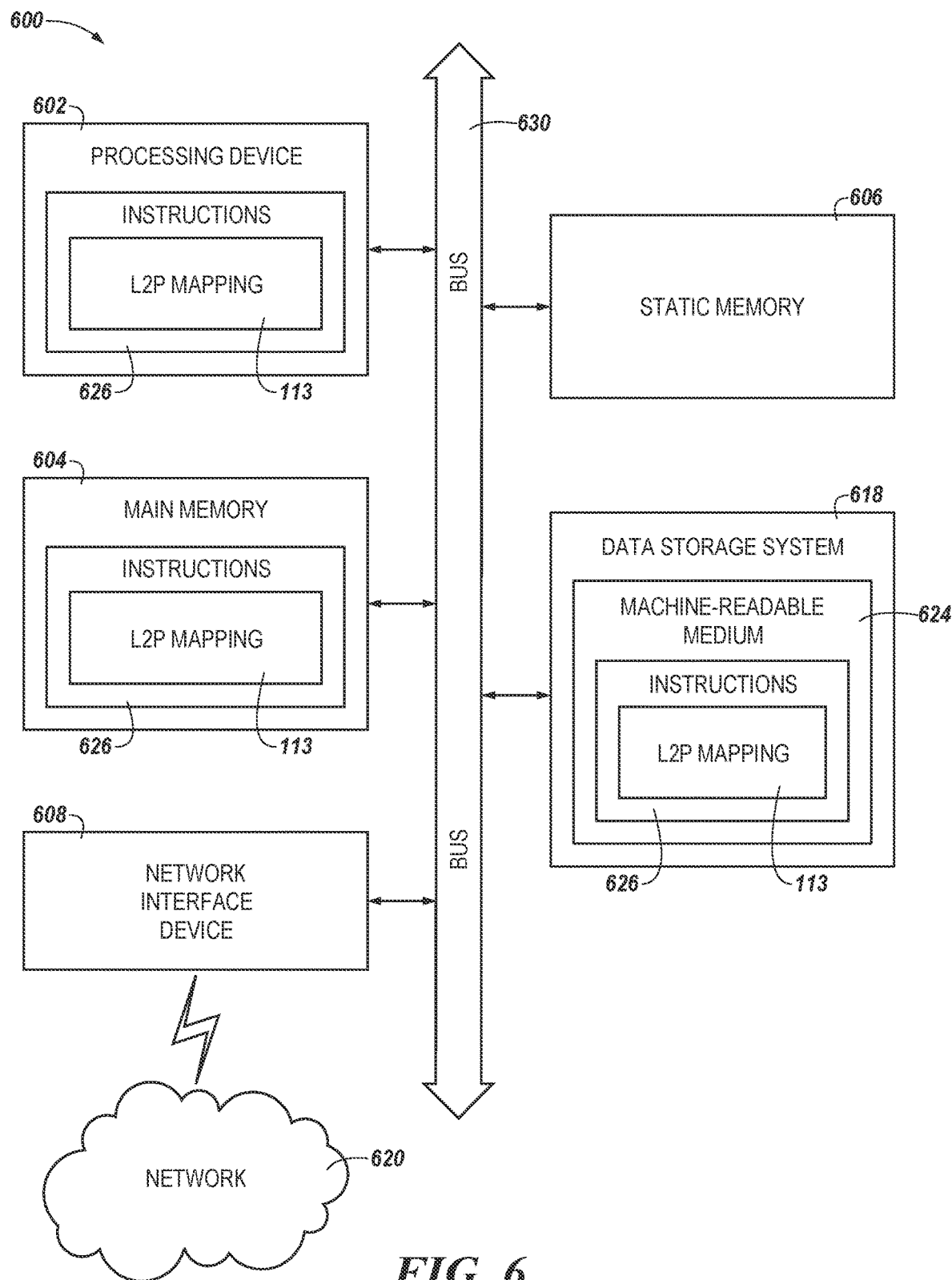
FIG. 6 is a block diagram of an example computer system in which embodiments of the present disclosure may operate.

FIG. 6 is a block diagram of an example computer system 600 in which embodiments of the present disclosure may operate. For example, FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the logical-to-physical mapping component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a logical-to-physical mapping component (e.g., the logical-to-physical mapping component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
a logical to physical (L2P) data structure; and
a processing device configured to:
determine that an offset between a physical page address (PPA) and a logical block address (LBA) will be altered in response to writing data corresponding to the PPA and at least one parity bit to the L2P data structure; and
cause an indication corresponding to the offset to be written to the L2P data structure in response to a determination that the offset will be altered in response to writing the data and the parity bit to a first level of the L2P data structure or to a second level of the L2P data structure, or both.

2. The apparatus of claim 1, wherein the indication corresponds to a determination that a first portion of the data is consecutive with respective to a preceding L2P address written to the L2P data structure.

3. The apparatus of claim 1, wherein the indication corresponds to a determination that a second portion of the data is consecutive with respect to a subsequent L2P address written to the L2P data structure.

4. The apparatus of claim 1, wherein the indication corresponds to a determination that a first level of the L2P data structure and a second level of the L2P data structure contain consecutively written data.

5. The apparatus of claim 1, wherein the indication corresponds to a determination that a first level of the L2P data structure or a second level of the L2P data structure, or both, contain non-consecutively written data.

6. The apparatus of claim 1, wherein the indication corresponds to a determination that a first portion of the data corresponding to the PPA is written to a first level of the L2P data structure and a second portion of the data corresponding to the PPA is written to the second level of the L2P data structure.

7. The apparatus of claim 1, wherein the processing device is configured to alter the offset in response to a memory block being opened to accommodate at least a portion of the data corresponding to the PPA.

8. The apparatus of claim 1, wherein a first portion of the data corresponding to the PPA is written to the first level of the L2P data structure and a second portion of the data corresponding to the PPA is written to the second level of the L2P data structure, and
the processing device is configured to alter the offset based, at least in part, on the first portion of the data being written to the first level of the L2P data structure and the second portion of the data being written to the second level of the L2P data structure.

9. An apparatus, comprising:
a memory device configured to store a logical to physical (L2P) data structure; and
a processing device coupled to the memory device, wherein the processing device is configured to:
determine that a first portion of a L2P address is to be written to a first memory block of the memory device and a second portion of the L2P address is to be written to a second memory block of the memory device, the L2P address comprising at least one parity bit;
determine whether an offset corresponding to a physical page address (PPA) and a logical block address (LBA) associated with the L2P address occurs based on the first portion of the L2P address being written to the first memory block and the second portion of the L2P address being written to the second memory block; and
write an indication corresponding to the offset to the L2P address.

10. The apparatus of claim 9, wherein the indication corresponds to a determination that a third memory block is being opened to accommodate at least a portion of the L2P address.

11. The apparatus of claim 9, wherein a first bit and a second bit associated with the indication correspond to a determination that the first portion of the L2P address is consecutive with respect to a preceding L2P address written to the first memory block and the second portion of the L2P address is consecutive with respect to a subsequent L2P address written to the second memory block.

12. The apparatus of claim 9, wherein a first bit and a second bit associated with the indication correspond to a determination that data written to the first memory block and the second memory block is non-consecutive.

13. The apparatus of claim 9, wherein the processing device is configured to:
write a first bit sequence to a second level of the L2P data structure in response to a determination that the offset does not affect the data written to a first level of the L2P data structure; and
write a second bit sequence to the second level of the L2P data structure in response to determining that the offset affects the data written to the first level of the L2P data structure.

14. A method, comprising:
determining that writing data corresponding to a physical page address (PPA) of a memory device to a logical to physical (L2P) data structure of the memory device results in a change to an offset between the PPA and a corresponding logical block address (LBA) when the data is written across more than one memory block of the memory device;
writing the data and at least one parity bit to the L2P data structure based on determining that writing the data results in the offset; and
writing an indication corresponding to the offset to the L2P data structure.

15. The method of claim 14, further comprising:
writing the data corresponding to the PPA to a first level of the L2P data structure or a second level of the L2P data structure, or both, or
writing the indication to the first level of the L2P data structure or the second level of the L2P data structure, or both.

16. The method of claim 14, further comprising writing a particular bit sequence to a second level of the L2P data structure in response to determining that the offset does not affect data written to a first level of the L2P data structure.

17. The method of claim 14, wherein the data corresponding to the PPA comprises a thirty-two bit data string and wherein the method further comprises writing the indication corresponding to the offset to a thirty-first and a thirty-second location in the thirty-two bit data string.

18. The method of claim 14, wherein the indication comprises two bits, and wherein the method further comprises writing the indication comprising the two bits to the L2P data structure in response to a determination that the data corresponding to the PPA is written to a first level of the L2P data structure or a second level of the L2P data structure, or both.

19. The method of claim 14, further comprising writing at least one redundant array of NAND parity bit as part of writing the at least one parity bit to the L2P data structure.

20. The method of claim 14, further comprising writing a particular bit sequence to the L2P data structure in response to determining that a first portion of the data written to the L2P data structure corresponds to a non-consecutive PPA with respect to a preceding L2P address written to the L2P data structure, and a second portion of the data is consecutive with respect to a subsequent L2P address written to the L2P data structure.

* * * * *